United States Patent [19]

Kuldvere

[11] Patent Number: 5,765,790

[45] Date of Patent: Jun. 16, 1998

[54] ERGONOMIC MOUSE PAD

[75] Inventor: Jaakko Kuldvere, Syvänniemi, Finland

[73] Assignee: Top-Cousins Oy, Finland

[21] Appl. No.: 586,869

[22] PCT Filed: Aug. 4, 1994

[86] PCT No.: PCT/FI94/00336

§ 371 Date: Jan. 24, 1996

§ 102(e) Date: Jan. 24, 1996

[87] PCT Pub. No.: WO95/04483

PCT Pub. Date: Feb. 16, 1995

[30] Foreign Application Priority Data

Aug. 9, 1993 [FI] Finland .................. 933501

[51] Int. Cl.$^6$ .................. B68G 5/00
[52] U.S. Cl. .................. 248/118; 108/43
[58] Field of Search .................. 248/118, 118.1,
248/118.3, 918, 346.01, 346.04; 108/43

[56] References Cited

U.S. PATENT DOCUMENTS

| | | | |
|---|---|---|---|
| 4,494,755 | 1/1985 | Caillouet, Jr. | 108/43 |
| 4,852,498 | 8/1989 | Judd | 108/43 |
| 5,072,905 | 12/1991 | Hyatt | |
| 5,127,339 | 7/1992 | Hood, Jr. | 108/43 |
| 5,195,705 | 3/1993 | Kline et al. | 248/118 |
| 5,301,908 | 4/1994 | Reames | |

OTHER PUBLICATIONS

Moore "Idé och produktkatalog 1993" Mar.-93.

*Primary Examiner*—Ramon O. Ramirez
*Assistant Examiner*—Willie Berry, Jr.
*Attorney, Agent, or Firm*—Donald A. Kettlestrings

[57] ABSTRACT

The invention is meant to be used on the thigh above the knee. The innovative idea is a concave bottom (FIG. 2 *a*), which corresponds to the shape of the thigh and a flat surface (FIG. 2 *b*). Thus, the upper limb can rest on the thigh. In addition, the wrist is more solidly placed in this work position. The upper limb stays better in its position. There is no need to make an unnecessary movement with it or flex it. The upper limb acts as a weight to the ergonomic mouse pad.

7 Claims, 1 Drawing Sheet

ERGONOMIC MOUSE PAD

The ergonomic mouse pad is applicable in any work with a micro computer or terminal work station requiring the use of the mouse.

At present the mouse is commonly used on a desk. It is used directly on a desk or on a pad kept on the desk. The pad is flat on both sides. It occupies space on the desk and causes the user of the mouse to lean forward which, in turn, brings the monitor screen too close. In addition, the muscles in the shoulder region have to support the arm and the tendons of the lower arm and the wrist might become inflamed. Using the mouse on the desk places stress on the extensors of the index finger.

Another commonly used way is to attach the mouse firmly to the computer, the keyboard or in a close vicinity to the hardware (this is referred to as ball mouse). This causes, as before, the user to lean forward and, in turn, brings the screen too close. Therefore, the muscles in the should region have to support the arm and the tendons of the lower arm and the wrist might be inflamed. Depending on its position on the keyboard, the ball mouse also causes undue stress on the wrist muscles and the extensors of the index finger.

The ergonomic mouse pad is different from the flat mouse pad in that it is kept on the knee and that the bottom of it is concave. The new pad enables the user to use arms ergonomically. Man usually hangs his arms, which is a natural position. The position does not cause stress on his limbs or make him support his arms unconsciously. Near the body the arm is closer to its ergonomic position. The ergonomic pad enables to avoid undue stress on the arm and upper body. The sitting posture improves, too, as well as the bearing. In addition, the elbow joint can work in a more upright position. The ergonomic pad enables the person using the mouse to make better use of the back rest of the chair. Furthermore, thanks to the invention, it is easier to sit in an appropriate distance from the screen. Finally, the ergonomic pad clears space on the desk. The invention also meets what is state in the 1. clause of the patent criteria.

Next, the invention is explained with the help of figures.

b) shows the flat surface from above.

c) shows the elevated edge in the back and the corners.

d) shows the wrist rest in the front.

e) shows the high friction material of the concave bottom.

Figure 1:
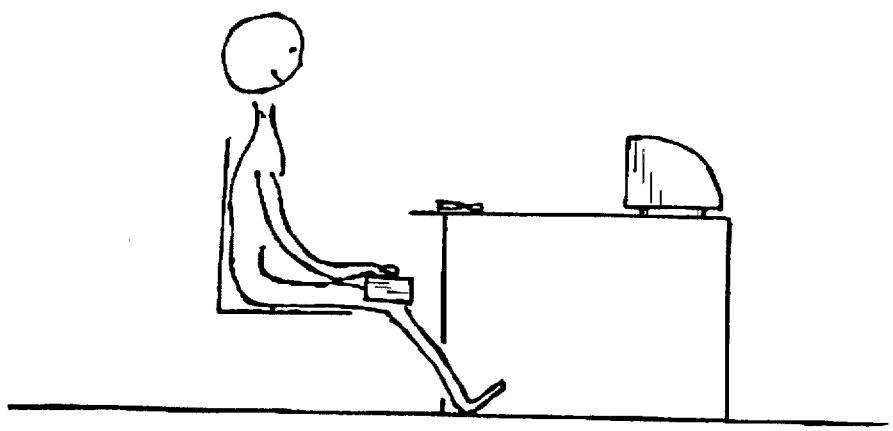
FIG. 1 shows the position of the ergonomic mouse pad, on the thigh above the knee.
Figure 2:
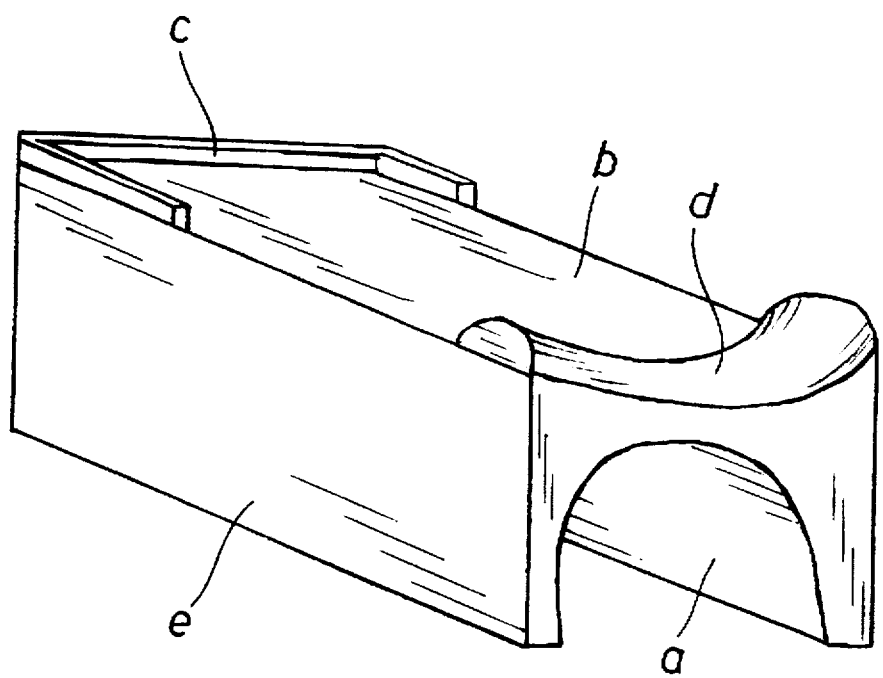
FIG. 2 shows the ergonomic mouse pad as a perspective figure in which a) shows the concave shape from below.

The ergonomic mouse pad is meant to use on the thigh above the knee (FIG. 1). The innovative idea is the concave bottom (FIG. 2a), which corresponds to the shape of the thigh and the flat surface (FIG. 2b). Thus, the arm can rest on the thigh. This enables the wrist to have a more solid position, too. In addition, the upper limb stays better in the position. There is no need to make an unnecessary movement with it or flex it. Moreover, the upper limb acts as a weight for the ergonomic mouse pad.

It is characteristic of the invention that the concave shape corresponds to the shape of the thigh above the knee. Thus, the mouse pad is convenient to use and it stays firmly in place. It is essential of the invention that the surface is flat (FIG. 2b). The surface may be e.g. a square, circle or oval or polygon in shape. There is an elevated edge in the back and the corners of the surface (FIG. 2c), which prevents the mouse sliding away from the surface when not used. Another characteristic of the ergonomic mouse pad is that its sides are sturdy enough (FIG. 2e). The concave bottom is against the thigh. The bottom is made of soft material and the flat surface is made of hard material enabling the upper limb a flexible movement when the mouse is used. Yet another characteristic is that the concave shape of the bottom against the thigh is made of high friction material (FIG. 2a). Another benefit of the invention is that there is an elevated, arched wrist rest in the front (FIG. 2d).

The invention is applicable in all work with a computer requiring the use of the mouse. This is not to curtail to use of the invention for the said purpose only but it is conceivable that there are many possible applications within the ramifications of the patent criteria concerning an inventive idea as follows.

I claim:

1. A pad for use with a computer mouse and for positioning the pad on a thigh of a computer user, said pad comprising:

first and second opposed sides;

an element having a substantially flat surface defining back, side and front portions and where said element is connected to and extends between said first and second opposed sides;

said first and second opposed sides cooperating with each other and with said element to define an open concave bottom for receiving only a single thigh of a computer user; and a wrist rest extending from said front portion of said flat surface.

2. A pad as in claim 1 wherein said wrist rest defines an arched upper surface.

3. A pad as in claim 1 wherein an elevated edge extends only part way along each of said side portions.

4. A pad as in claim 1 wherein said concave bottom is made of high friction material.

5. A pad as in claim 1 wherein said first and second opposed sides are sturdy.

6. A pad as in claim 1 wherein said concave bottom is made of soft material and said flat surface is made of hard material.

7. A pad as in claim 1 further including an elevated edge extending from said back and side portions of said flat surface for preventing sliding movement of said mouse from said flat surface.

* * * * *